(12) United States Patent
Meyer et al.

(10) Patent No.: US 8,029,652 B2
(45) Date of Patent: Oct. 4, 2011

(54) ACTIVATION OF MOLECULAR CATALYSTS USING SEMICONDUCTOR QUANTUM DOTS

(75) Inventors: Thomas J. Meyer, Chapel Hill, NC (US); Milan Sykora, Los Alamos, NM (US); Victor I. Klimov, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1255 days.

(21) Appl. No.: 11/605,672

(22) Filed: Nov. 28, 2006

(65) Prior Publication Data
US 2007/0137998 A1 Jun. 21, 2007

Related U.S. Application Data

(60) Provisional application No. 60/740,588, filed on Nov. 28, 2005.

(51) Int. Cl.
*H01L 31/0264* (2006.01)
*C25B 9/06* (2006.01)
(52) U.S. Cl. ......... 204/242; 136/258; 136/264; 136/265
(58) Field of Classification Search .................. 204/242; 136/258, 264, 265
See application file for complete search history.

(56) References Cited

U.S. PATENT DOCUMENTS

| 2005/0000565 | A1* | 1/2005 | Zeng .............................. 136/256 |
| 2005/0211290 | A1* | 9/2005 | Deng et al. ..................... 136/252 |
| 2007/0012355 | A1* | 1/2007 | LoCascio et al. ............. 136/252 |
| 2007/0092927 | A1* | 4/2007 | Johnson et al. ................. 435/25 |

OTHER PUBLICATIONS

Murray et al., "Synthesis and Characterization of Nearly Monodisperse CdE (E=S, Se, Te) Semiconductor Nanocrystallites," J. Am. Chem. Soc. 1993, 115, 8706-8715.
Treadway et al., "Visible Region Photooxidation on $TiO_2$ with a Chromophore-Catalyst Molecular Assembly," Inorg. Chem. 1999, 38, 4386-4387.
Barbe et al., "Nanocrystalline Titanium Oxide electrodes for Photoboltaic Applications," J. Am. Ceram. Soc., 80, 12, 3157-71 (1997).
Meyer et al., "The Remarkable Reactivity of High Oxidation State Ruthenium and Osmium Polypyridyl Complexes," Inorg.Chem, 2003, 42, 8140-8160.

(Continued)

*Primary Examiner* — Alexa D. Neckel
*Assistant Examiner* — Nicholas A. Smith
(74) *Attorney, Agent, or Firm* — Robert P. Santandrea; Bruce H. Cottrell; Meredith A. Schoenfeld

(57) ABSTRACT

Photocatalytic materials based on coupling of semiconductor nanocrystalline quantum dots (NQD) and molecular catalysts. These materials have capability to drive or catalyze non-spontaneous chemical reactions in the presence of visible radiation, ultraviolet radiation, or both. The NQD functions in these materials as a light absorber and charge generator. Following light absorption, the NQD activates a molecular catalyst adsorbed on the surface of the NQD via transfer of one or more charges (either electrons or electron-holes) from the NQD to the molecular catalyst. The activated molecular catalyst can then drive a chemical reaction. A photoelectrolytic device that includes such photocatalytic materials is also described.

21 Claims, 6 Drawing Sheets

OTHER PUBLICATIONS

Comte et al., "Artifical Analogues of the Oxygen-Evolving Complex in Photosynthesis: The Oxo-Bridged Ruthenium Dimer $L_2(H_2O)Ru^{III}\text{-}O\text{-}Ru^{III}(H_2O)L_2$, $L=2,2'$-Bipyridyl-4,4'-Dicarboxylate," Journal of Molecular Catalysis, 52 (1989) 63-84.

Gallagher et al., "Surface Control of Oxidation by an Adsorbed $Ru^{IV}$-Oxo Complex," J. Am. Chem. Soc. 2001, 123, 5308-5312.

Takeuchi et al., "Redox and Spectral Properties of Monooxo Polypyridyl Complexes of Ruthenium and Osmium in Aqueous Media," Inorg. Chem. 1984, 23, 1845-1851.

* cited by examiner

ACTIVATION OF MOLECULAR CATALYSTS USING SEMICONDUCTOR QUANTUM DOTS

REFERENCE TO PRIOR APPLICATION

This application claims the benefit of U.S. Provisional Application No. 60/740,588, filed Nov. 28, 2005.

STATEMENT REGARDING FEDERAL RIGHTS

This invention was made with government support under Contract No. DE-AC 52-06 NA 25396, awarded by the U.S. Department of Energy. The government has certain rights in the invention.

BACKGROUND OF INVENTION

The invention relates to photocatalytic materials. More particularly, the invention relates to photocatalytic materials comprising nanocrystalline quantum dots chemically coupled to molecular catalysts. Even more particularly, the invention relates to photoelectrolytic devices comprising such photocatalytic materials.

The broad field of photocatalysis utilizes numerous molecular catalyst or semiconductor nanocrystalline catalysts. However, limited attempts have been made to couple molecular and serniconductor components in a functional assembly.

In one approach, the light activated component is the molecular catalyst rather than the semiconductor. The semiconductor is a "passive" component of the assembly, as activation requires absorption of a photon by the molecular catalyst and subsequent electron transfer into the semiconductor. Moreover, this approach utilizes mesoscopic nanocrystalline materials with average particle sizes of at least about 20 nm rather than quantum size (i.e., 2-10 nm diameter) materials, thus eliminating the possibility of taking advantage of quantum size effects.

Current photocatalytic materials rely on mesoscopic semiconducting materials that are unable to capitalize on quantum effects. In addition, the dyes that are used to sensitize the photocatalytic material have poor stability, low absorptivity, and narrow absorptivity ranges, and a limited ability to convert photon energy to charges. Therefore, what is needed is a photocatalytic material having improved stability. What is also needed is a photocatalytic material having a broader absorptivity range and improved capability to convert photon energy to electronic charge.

SUMMARY OF INVENTION

The present invention meets these and other needs by providing photocatalytic materials based on coupling of semiconductor nanocrystalline quantum dots (also referred to herein as "NQDs") and molecular catalysts. These materials have capability to drive or catalyze non-spontaneous chemical reactions (i.e., reactions requiring energy input) in the presence of visible radiation, ultraviolet radiation, or both. The NQD functions in these materials as a light absorber and charge generator. Following light absorption, the NQD activates a molecular catalyst adsorbed on the surface of the NQD via one or more charge (either electron or hole) transfers between the NQD and the molecular catalyst. The activated molecular catalyst can then drive a chemical reaction. A photoelectrolytic device that includes such photocatalytic materials is also described.

Accordingly, one aspect of the invention is to provide a photocatalytic material. The photocatalytic material comprises: a plurality of nanocrystalline quantum dot absorbers, wherein each of the nanocrystalline quantum dot absorbers absorbs light emitted from a light source to generate at least one electron-hole pair; and a molecular catalyst chemically coupled to each of the plurality of nanocrystalline quantum dot absorbers by a linking moiety, wherein each of the plurality of nanocrystalline quantum dot absorbers absorbs light emitted from a light source to generate at least one electron-hole pair, the at least one electron-hole pair having a sufficient potential to activate the molecular catalyst, and wherein the molecular catalyst oxidizes or reduces an electrolytic species.

A second aspect of the invention is to provide a method of oxidizing an electrolytic species. The method comprises the steps of: providing the electrolytic species and a photocatalytic composite material, the photocatalytic composite material comprising at least one nanocrystalline quantum dot absorber, wherein the nanocrystalline quantum dot absorber is chemically coupled to a molecular catalyst; generating at least one electron-hole pair in the quantum dot absorber, the electron-hole pair having a sufficient potential to activate the molecular catalyst; activating the molecular catalyst; and oxidizing the electrolytic species with the molecular catalyst.

A third aspect of the invention is to provide a photoelectrolytic device. The photoelectrolytic device comprises: an optically transparent electrode; an anode disposed on the optically transparent electrode; and a cathode electrically connected to the anode. The anode comprises: a wide band gap semiconductor disposed on the optically transparent electrode and a photocatalytic material chemically coupled to the wide band gap semiconductor, wherein the photocatalytic material comprises: a plurality of nanocrystalline quantum dot absorbers, wherein each of the nanocrystalline quantum dot absorbers absorbs light emitted from a light source to generate at least one electron-hole pair; and a molecular catalyst chemically coupled to each of the plurality of nanocrystalline quantum dot absorbers by a linking moiety, the at least one electron-hole pair having a sufficient potential to activate the molecular catalyst, and wherein the molecular catalyst oxidizes an electrolytic species.

A fourth aspect of the invention is to provide a method of making a photoelectrolytic device. The photoelectrolytic device comprising a cathode and an anode comprising an optically transparent material, a wide band gap semiconductor, and a photocatalytic composite material. The method comprises the steps of: providing the optically transparent electrode and the cathode; depositing the wide band gap semiconductor on the optically transparent electrode; and chemically coupling the photocatalytic composite material to the wide band gap semiconductor to form the anode, the photocatalytic composite material comprising a plurality of nanocrystalline quantum dot absorbers, wherein each of the nanocrystalline quantum dot absorbers is chemically coupled to a catalyst.

A fifth aspect of the invention is to provide a method of making a photocatalytic material comprising a plurality of nanocrystalline quantum dot absorbers and a molecular catalyst chemically coupled to each of the plurality of nanocrystalline quantum dot absorbers by a linking moiety. The method comprising the steps of providing a first stock solution comprising the plurality of nanocrystalline quantum dot absorbers; providing a second stock solution comprising the molecular catalyst; combining the first stock solution and the second stock solution to achieve a predetermined concentration ratio of molecular catalyst to nanocrystalline quantum dot absorber to form the photocatalytic material.

These and other aspects, advantages, and salient features of the present invention will become apparent from the following detailed description, the accompanying drawings, and the appended claims.

DETAILED DESCRIPTION

Figure 1:
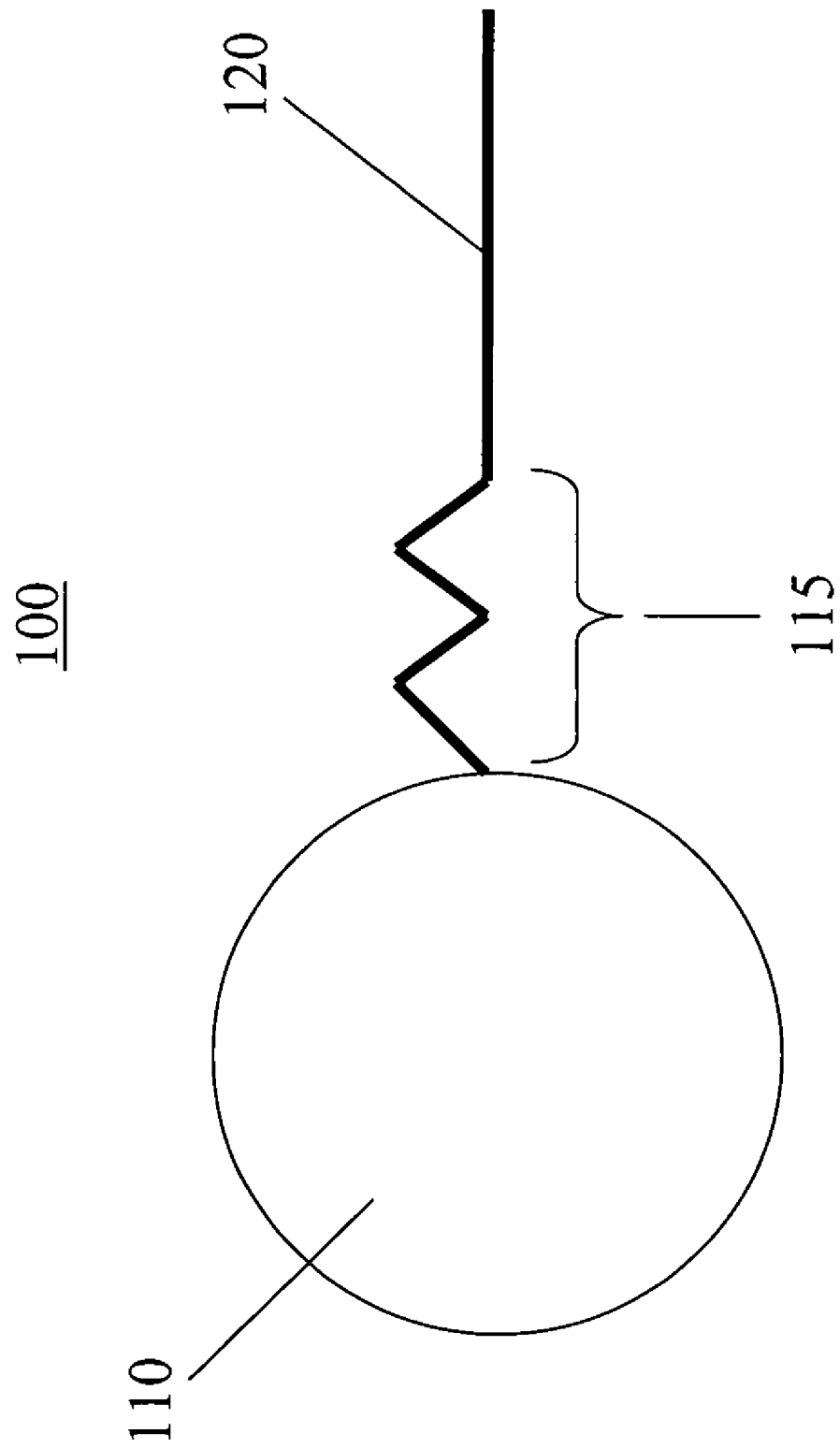
FIG. 1 is a schematic representation of a photocatalytic material.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general, it will be understood that the illustrations are for the purpose of describing a particular embodiment of the invention and are not intended to limit the invention thereto.

Turning to FIG. 1, a photocatalytic material of the present invention is schematically shown. Photocatalytic material 100 is based on a coupling semiconductor nanocrystalline quantum dot 110 (also referred to hereinafter as "NQDs") and at least one molecular catalyst 120. Photocatalytic material 100 is capable of driving or catalyzing non-spontaneous chemical reactions (i.e., reactions that require some form of energy input) in the presence of visible radiation, ultraviolet radiation, or both. NQD 110 functions as a light absorber and charge generator. Following light absorption, NQD 110 converts light energy into at least one electron-hole pair. Multiple electron-hole pairs can be generated in NQD 110 following the absorption of a single photon by NQD 110 via the process of carrier multiplication. NQD 110 activates molecular catalyst 120, which is adsorbed on the surface of the NQD, via a transfer of charge between NQD 110 and molecular catalyst 120. Such charge transfer may include transfer of either at least one electron or an electron-hole. The activated molecular catalyst 120 can then drive a chemical reaction such as, for example, the oxidation or reduction of an electrolytic species.

NQD comprises a material having a potential that is sufficient to either reduce or oxidize the molecular catalyst. In one embodiment, NQD 110 may comprise a semiconducting material, such as silicon, germanium, metal sulfides, metal selenides, metal tellurides, metal phosphides, metal arsenides, or the like. Non-limiting examples of such semiconducting materials include, but are not limited to, cadmium sulfide (CdS), cadmium selenide (CdSe), cadmium telluride (CdTe), lead sulfide (PbS), lead selenide (PbSe), silicon (Si), indium phosphide (InP), indium arsenide (InAs), and gallium arsenide (GaAs). As used herein, a nanocrystalline quantum dot is understood to be a semiconductor nanocrystal consisting of hundreds of atoms to thousands of atoms. In one embodiment, NQD 110 is prepared by a method described in "Synthesis and Characterization of Nearly Monodisperse CdE (E=S, Se, Te) Semiconductor Nanocrystallites," by C. B. Murray et al. in J. Am. Chem. Soc. Vol. 115(19) (1993) pp. 8706-8715, the contents of which are incorporated by reference herein in their entirety. The method described by Murray et al. provides monodisperse (<5% rms in diameter) nanometer size crystallites. The synthesis begins with the rapid injection of organometallic reagents into a hot coordinating solvent to produce a temporarily discrete nucleation. Slow growth and annealing in the coordinating solvent results in uniform surface derivatization and regularity in core structure. Such selective precipitation provides powders of nearly monodisperse nanocrystallites that can be dispersed in a variety of solvents. The average crystallite size is tunable from about 12 Å to about 115 Å.

Molecular catalyst 120 is typically an oxidation or reduction catalyst and has either an oxidation or reduction potential that is within the band gap of the material comprising the NQDs. In one embodiment, molecular catalyst 120 is a ruthenium poly-pyridine complex. Non-limiting examples of such catalysts include, but are not limited to, cis-$[Ru^{IV}(bpy)_2(py)(O)]^{2+}$, $[Ru^{VI}(bpy)_2(O)_2]^{2+}$, $[Ru^{IV}(tpy)(bpy)(O)]^{2+}$, and cis, cis-$[(bpy)_2(H_2O)Ru^{III}(\mu\text{-}O)Ru^{III}(H_2O)(bpy)_2]^{4+}$, (where bpy=2,2' bipyridine, and tpy=2,2':6',2''-terpyridine). These catalysts have been shown to be effective oxidants of organic substrates, such as amines, alcohols, phenols, quinones, sulfides, thiols, sulfoxides, phosphines, alkanes, alkenes, and water. NQD 110 is chemically coupled to molecular catalyst 120 via a chemical linker 115. Appropriate chemical linkers include groups such as, but not limited to, a carboxylic (—COOH) group, a phosphonate (—$PO_3H_2$) group, and a mercapto (SH—) group. For example, the Ru catalyst cis,cis-$[(HO_3P\text{-}bpy)_2(H_2O)Ru^{III}(\mu\text{-}O)Ru^{III}(H_2O)(bpy)_2]^{4+}$ can be chemically attached to a surface of a CdSe NQD via the $HO_3P$— functionality.

The absorption of an UV or visible photon will result in a generation of at least one electron-hole pair in NQD 110. The hole generated in NQD 110 has sufficient potential to activate molecular catalyst 120 to its active form. The hole inside a CdSe NQD, for example, has an oxidation potential of about 1.7 eV vs. a standard hydrogen electrode (NHE). The actual CdSe oxidation potential may vary slightly with NQD particle size. This is sufficient to oxidize the Ru-catalyst cis,cis-$[(HO_3P\text{-}bpy)_2(H_2O)Ru^{III}(\mu\text{-}O)Ru^{III}(H_2O)(bpy)_2]^{4+}$ to its active form, cis,cis-$[(HO_3P\text{-}bpY)_2(O)Ru^{V}(\mu\text{-}O)Ru^{V}(O)(bpy)_2]^{4+}$, which occurs at a potential of about 1.4 eV vs. NHE. When coupled with NQD absorption of four or fewer photons is sufficient to activate the catalyst. Thus, catalyst activation by NQD 110 is a thermodynamically favorable process. Hole transfer from NQD 110 to molecular catalyst 120 is also efficient, occurring on a picosecond time scale. The charge transfer competes with the energy transfer process—which may lower the catalytic efficiency. Charge transfer efficiency may be optimized through judicious selection of the size and composition of NQD 110.

In the case of the ruthenium molecular catalyst described above, four holes must be transferred from NQD 110 to molecular catalyst 120 to obtain molecular catalyst 120 in its active form. The absorption of a single photon by NQD 110 can lead to the generation of multiple electron-hole pairs via a process of carrier multiplication. This effect is unique to semiconductor NQDs—such as those mentioned above—that exhibit quantum confinement effects. Thus, activation of molecular catalyst 120 coupled to NQD 110 may be achieved by absorption of a single photon.

Molecular catalyst 120 is coupled to NQD 110 by using a ligand exchange method. In one embodiment, the NQDs are mixed with greater than a 100-fold excess of functionalized catalyst in a solvent such as, for example, benzonitrile, and stirred at room temperature in the dark for 3 to 4 days to form photocatalytic material 100. Excess catalyst may then be separated from photocatalytic material 100 by membrane separation. The concentration of molecular catalyst adsorbed on the surface of the NQDs may be controlled by controlling the concentration of molecular catalyst in solution and the time that NQDs are exposed to the molecular catalyst. The number of surface adsorbed catalysts is determined by spectroscopic methods. The method allows for precise control of number molecular catalysts 120 adsorbed on the surface of NQD 110.

Methods of preparing and modifying molecular catalyst 120 with chemical linker 115 are described "Redox and Spectral Properties of Monooxo Polypyridyl Complexes of Ruthenium and Osmium in Aqueous Media" by K. J. Takeuchi et al. in Inorg. Chem. vol. 23 (1984) pp. 1845-1851; "Surface Control of Oxidation by an Adsorbed $Ru^{III}$-Oxo Complex," by L. A. Gallagher et al. in J. Am. Chem. Soc. Vol. 123 (2001) pp. 5308-5312; and "Artificial Analogues of the Oxygen-Evolving Complex in Photosynthesis: the Oxo-Bridged Ruthenium Dimer $L_2(H_2O)Ru^{III}$—O—$Ru^{III}(H_2O)L_2$, L=2,2'-bipyridyl-4,4'-dicarboxylate," by P. Comte et al. in J. Molecular Catalysis vol. 52 (1969) pp. 63-84, the contents of which are incorporated herein by reference in their entirety.

Hole transfer from the excited NQD 110 to molecular catalyst 120 depends on the potential of the hole photo-generated in the valence band of NQD 110. For CdSe NQDs, the potential of the hole in the valence band for different radii of NQDs is estimated to be 1.71 V, 1.73 V, and 1.75 V vs. NHE for NQDs having radii of 2.9 nm, 2.3 nm, and 1.9 nm, respectively. The reduction potential of $[(bpy)_2(O)Ru^V$—O—$Ru^V(O)(bpy)_2]^{4+}$, which is a model catalyst, is 1.36 V vs. NHE:

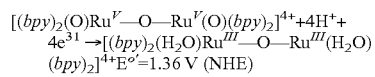

Full activation of molecular catalyst 120 requires that four holes be transferred from NQD 110 to molecular catalyst 120. A CdSe NQD hole, for example, has a potential sufficient to oxidize the above molecular catalyst to its active ($Ru^V$—O—$Ru^V$) form. While hole transfer is thermodynamically feasible, the efficiency and dynamics of the individual charge transfer steps may vary.

Once activated, molecular catalyst 120 can either oxidize or reduce an electrolytic species. When activated either chemically or electrochemically, polypyridine complexes of Ru (II-VI) are effective catalysts of various chemical transformations. For example, there are only a few, well-defined molecules that can catalyze the oxidation of water, and several Ru-based complexes perform successfully in this capacity. In one embodiment, activated molecular catalyst 120 oxidizes a water molecule to produce molecular oxygen via the chemical reaction:

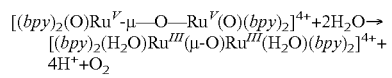

The above example serves as a foundation for a photoelectrolytic device for generating oxygen and hydrogen from water using solar radiation.

Photocatalytic material 100 may be used independently as a photocatalyst in homogenous or heterogeneous catalysis. Alternatively, photocatalytic material 100 may be used as an active component of a photoelectrolytic device such as, for example, a photocell.

Figure 2:
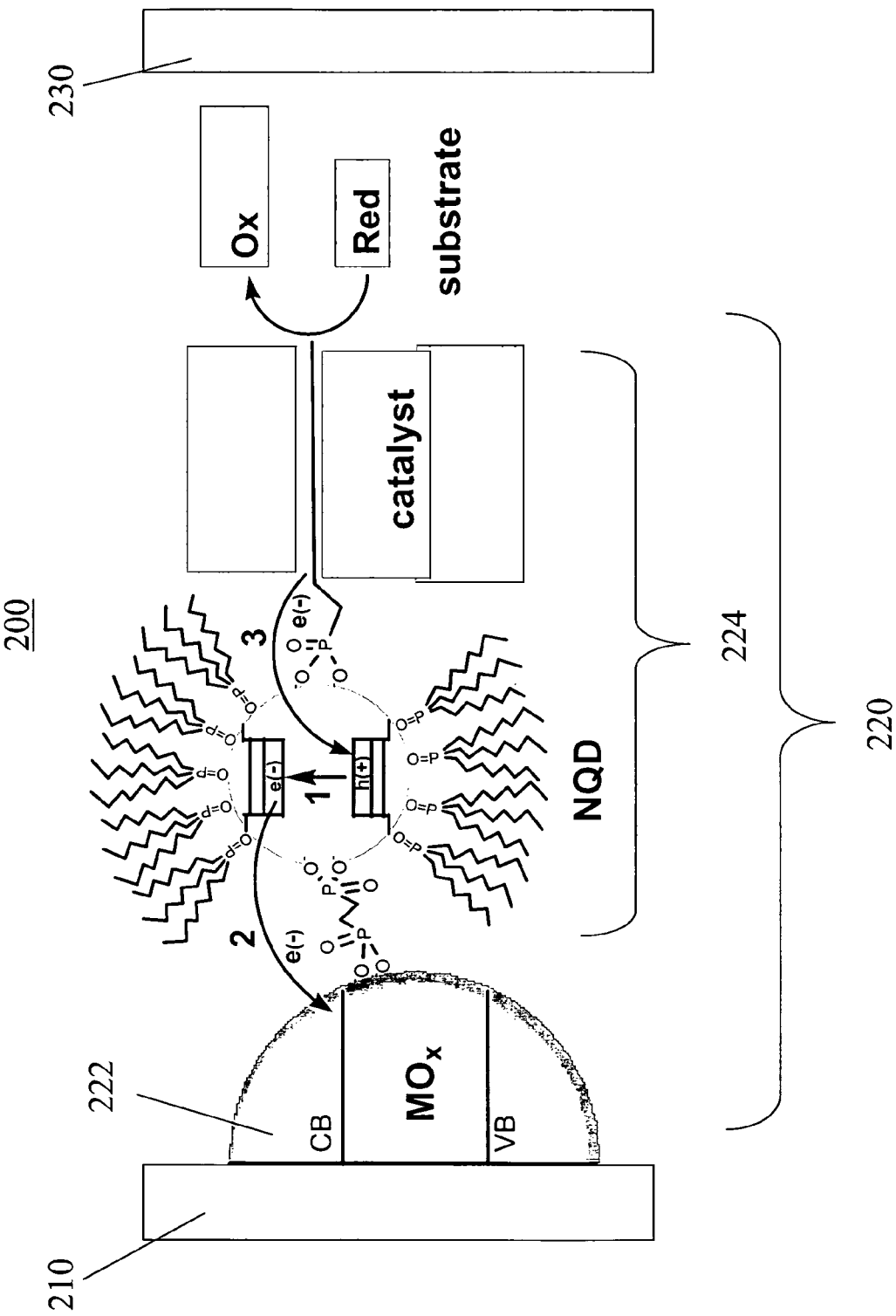
FIG. 2 is a schematic representation of a photoelectrolytic device.

Accordingly, the invention also provides a photoelectrolytic device that includes photocatalytic material 100, described hereinabove. A schematic representation of such a photoelectrolytic device is shown in FIG. 2. Photoelectrolytic device 200 comprises an optically transparent electrode 210, a photoanode 220 disposed on an optically transparent electrode 210 electrically connected to anode 220. Anode 220 comprises a wide band-gap semiconductor 222, such as, for example, titanium oxide, and a photocatalytic material 224 chemically coupled to wide band-gap semiconductor 222. Cathode 230 typically comprises platinum.

The optically transparent electrode comprises materials that are well known in the art known in the art such as, but not limited to, tin oxide, tin-doped indium oxide, and the like. The wide band gap semiconductor is typically a metal oxide ($MO_x$) such as titanium oxide ($TiO_2$) or the like. The function of the metal oxide in the photoanode is to serve as electron acceptor and a relay. Metal oxide nanocrystal particles (at least about 20 nm) and thin, nanoporous transparent films of these particles are prepared by using methods known in the art, such as that described in "Nanocrystalline Titanium Oxide Electrodes for Photovoltaic Applications," by C. J. Barbe et al. in J. Am. Ceramic Soc. 1997, volume 80(120 (1997) pp. 3157-3171, the contents of which are incorporated by reference herein in their entirety. The large surface area associated with thin films of nanocrystalline metal oxides makes them excellent candidates for applications in catalysis.

The photocatalytic material comprises a plurality of nanocrystalline quantum dot (NQD) photon absorbers and a molecular catalyst chemically coupled to each of the NQD photon absorbers by chemical moieties, both of which have been previously described herein.

The photocatalytic material may be coupled to the metal oxide by one of two methods. In one method, the NQD is first functionalized via ligand exchange with appropriate bifunctional ligands. The functionalization may take place in either an aqueous, ethanolic, acetonitrile, or tetrahydrofuran solution. The $MO_x$ film is exposed to the solution containing the linker functionalized NQDs, and the NQDs then self-assemble onto the metal oxide films. In the second method, the bifunctional molecular linker and NQD are sequentially deposited onto the nanocrystalline metal oxide. In this case, ligand exchange occurs in situ.

Figure 5:
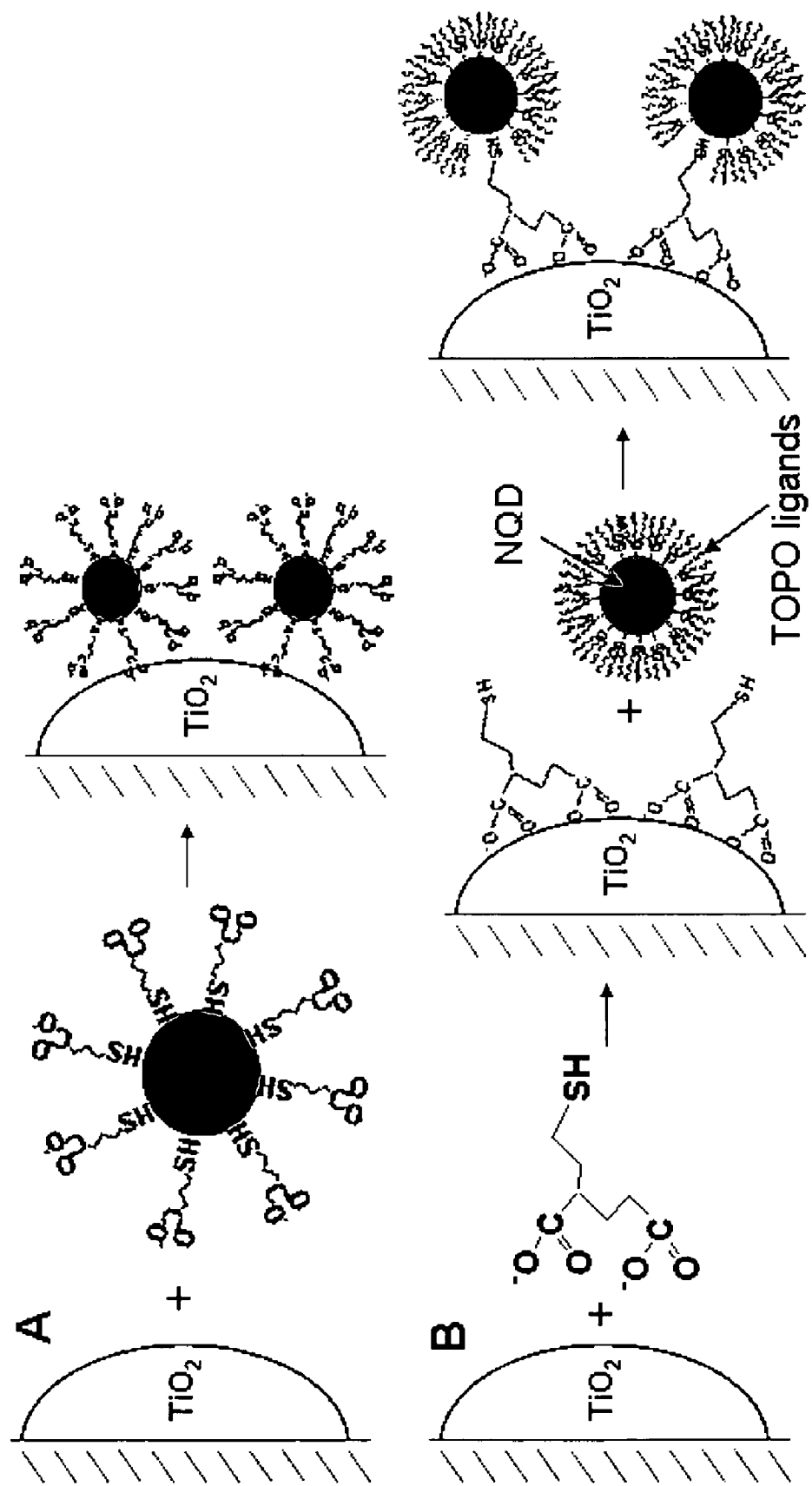
FIG. 5 shows two methods of linking NQDs to a wide band gap semiconductor.

The self-assembly approach for the preparation of $TiO_2$/NQD films is shown in FIGS. 5A and 5B. In FIG. 5A, the NQDs are first derivatized with carboxy-thiol ligands bifunctional ligands. The thiol group binds preferentially to the NQD surface, leaving the carboxylic acid group on the periphery. The NQDs are then adsorbed onto the nanocrystalline $TiO_2$ through the exposed carboxylic acids. In FIG. 5B, the surface of the nanocrystalline $TiO_2$ is first derivatized with bifunctional ligands in ethanol solution and then exposed to NQDs in toluene solution. This approach is more flexible with respect to the choice of linker molecules, as it directs binding between the NQD and $TiO_2$ and eliminates the potential cross-linking of NQDs.

Figure 6:
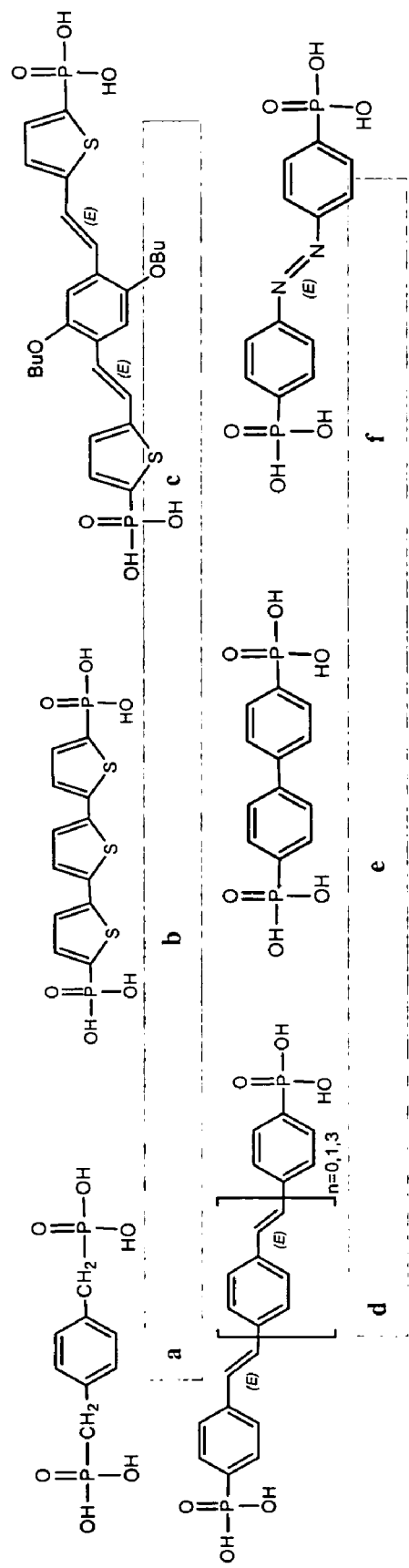
FIG. 6 shows candidate molecules for linking NQDs to a wide band gap semiconductor.

Various bifunctional linkers can be used in coupling of NQDs to the $MO_x$ film, provided they contain appropriate functional moieties with high chemical affinity towards both the $MO_x$ and NQD. Such moieties include —COOH, —SH, —$PO_3H_2$, and the like. Additionally, the linker should be short on molecular scale to provide a good electronic coupling between the $MO_x$ and NQD. Several examples of such linkers include, but are not limited to, commercially available carboxy-thiol bifunctional ligands. Other examples of such linkers are shown in FIG. 6. By utilizing the combination of appropriate moieties and linker size or length, it is possible to exploit the fact that the carboxylic acids and thiols bind preferentially to the metal oxide particles and NQDs, respectively. Other groups of materials utilized as linkers include ligands with phosphonic acid functionalities, as they have been shown to effectively bind to $MO_x$ and NQD semiconductor surfaces with linkages that are stable in aqueous media.

NQD/metal oxide and the NQD/Ru-catalyst assemblies serve as the building blocks in the fabrication of the photoanode. In the final photoanode assembly, the Ru catalysts are adsorbed onto the NQD surface. As previously described herein, the amount of molecular catalyst that is surface-bound to the NQD is controlled by the concentration of the molecular catalyst in solution. In a second approach, the NQD/Ru-complex assembly is isolated from any unbound molecular catalyst and exposed to a metal oxide film that has been derivatized with bifunctional ligands.

NQDs have very large extinction coefficients. The large NQD absorptivity in the visible spectral region (and near infrared for compositions such as CdTe) allows for a decrease in the overall film thickness, as compared to dye-based systems, thus resulting in shorter paths for electron diffusion within the $TiO_2$ and more efficient charge transport. The large absorption of the NQDs in the UV spectral region ensures that the photons are absorbed by the NQDs rather than by the $TiO_2$ nanoparticles, which could lead to harmful side-reactions.

In contrast to previous approaches to photoelectrolytic devices using photocatalytic materials, the semiconductor NQD, as described herein is the light sensitizer (i.e., a light absorber and charge generator). This approach has numerous advantages. The absorptivities of NQDs are typically 2-4 orders of magnitudes higher than absorptivities of molecular catalysts. Thus, incoming light can be absorbed more efficiently. In addition, the absorption spectra of NQDs can be easily tuned by varying NQD size. In contrast to the invention, variations in dye structures may simultaneously lead to increase in absorptivity and decrease in catalytic activity.

Unlike previous approaches, the invention uses quantum size (2-10 nm diameter) nanocrystalline semiconductor materials, rather than mesoscopic materials having average particle sizes of at least about 20 nm. NQDs can produce multiple electron-hole pairs in response to a single absorbed photon via the phenomenon known as carrier multiplication. This process can significantly increase the efficiency of photocatalysis in the blue-to-UV region of the solar spectrum. Whereas carrier multiplication is not efficient in bulk semiconductors due the restrictions imposed by momentum and energy conservation, the efficiency of this effect can be enhanced dramatically (by more than 600%) in NQDs.

The following example illustrates the advantages and features of the invention and is in no way intended to limit the invention thereto.

EXAMPLE 1

Preparation and Characterization of NQD/Molecular Complex Materials

Cadmium selenide (CdSe) NQDs were prepared using the method described in "Synthesis and Characterization of Nearly Monodisperse CdE (E=S, Se, Te) Semiconductor Nanocrystallites," by C. B. Murray et al. in J. Am. Chem. Soc. Vol. 115(19) (1993) pp. 8706-8715. The mean NQD radius and the NQD size dispersion were 2.3 nm and about 5%, respectively, as calculated from absorption spectra. The room temperature photoluminescence (PL) quantum efficiency of the NQDs was about 5%.

Figure 3:
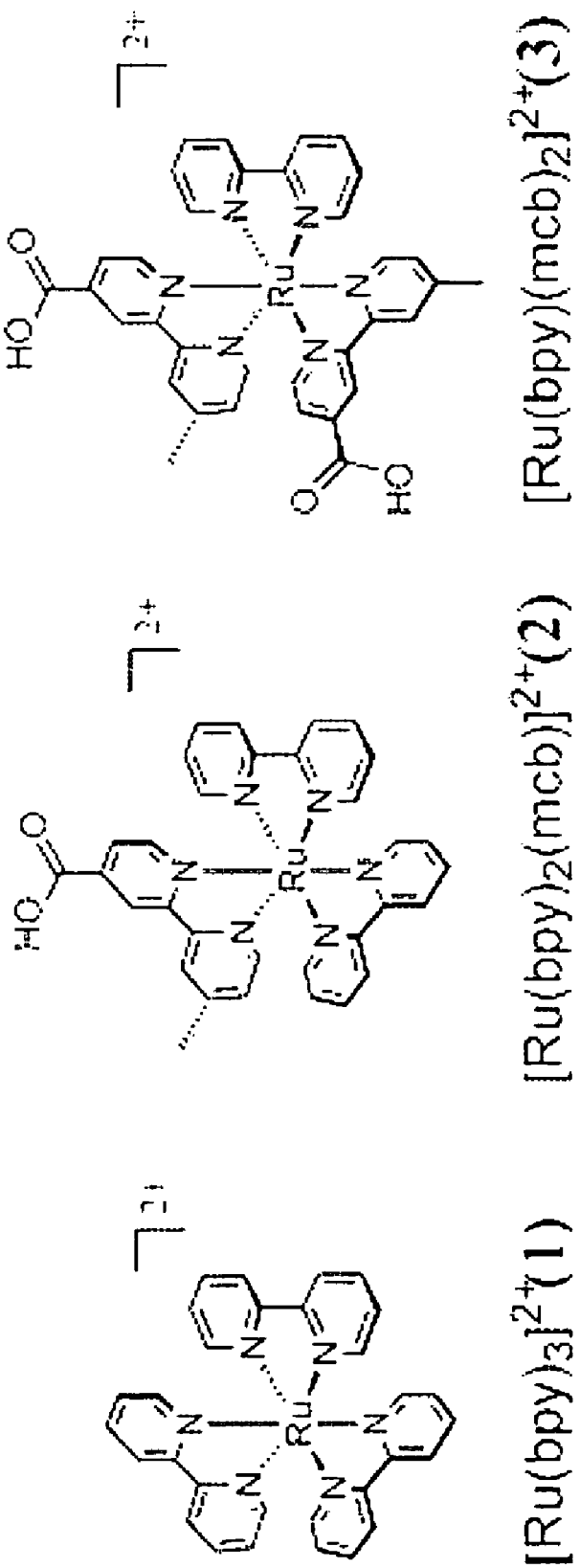
FIG. 3 shows the structures of $[Ru(bpy)_3]^{2+}$, $[Ru(bpy)_2(mcb)]^{2+}$, and $[Ru(bpy)(mcb)_2]^{2+}$ (where bpy=2,2'-bipyridine; mcb=4-carboxy-4'-methyl-2,2'-bipyridine)

The Ru-polypyridine complexes $[Ru(bpy)_3]^{2+}$, $[Ru(bpy)_2(mcb)]^{2+}$, and $[Ru(bpy)(mcb)_2]^{2+}$ (where bpy=2,2'-bipyridine; mcb=4-carboxy-4'-methyl-2,2'-bipyridine) were prepared using the method described in "Synthesis of Redox Derivatives of Lysine and Related Peptides Containing Phenothiazine of tris(2,2'-bipyridine)ruthenium(II)," by B. M. Peek et al. in J. Pep. Protein Res. vol. 38(2) (1991) pp. 0367-8377. Structures of the Ru-polypyridine complexes are shown in FIG. 3.

NQD/complex mixtures were prepared by mixing stock solutions of the NQDs and the complexes in benzonitrile. Control solutions were prepared by appropriate dilution of stock solutions.

Figure 4:
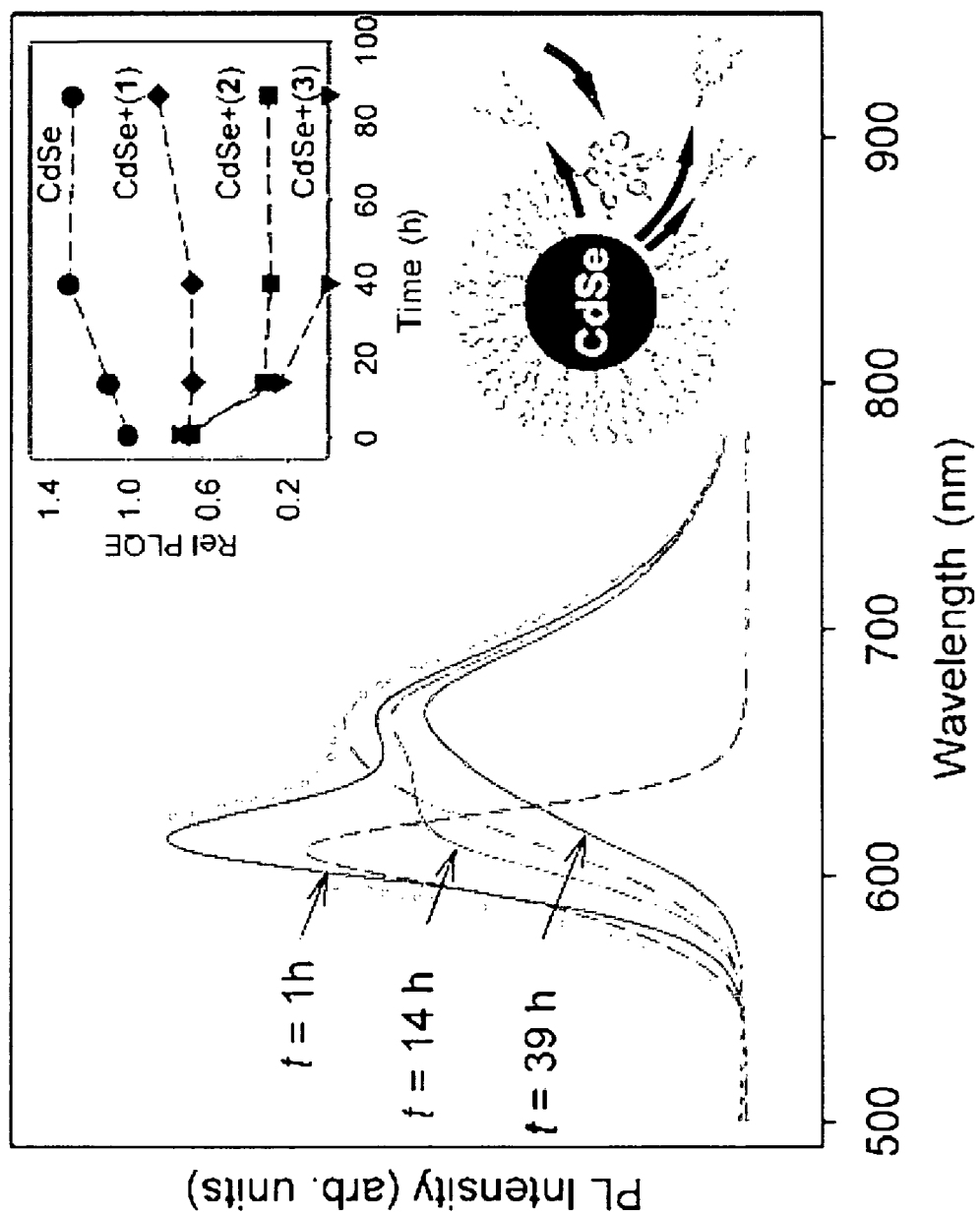
FIG. 4 shows emission spectra of a mixture of Cadmium selenide (CdSe) nanocrystalline quantum dots (NQDs) with a $[Ru(bpy)(mcb)_2]^{2+}$ complex at various times following the mixing of stock solutions.

FIG. 4 shows emission spectra of the mixture of the CdSe NQD with the $[Ru(bpy)(mcb)_2]^{2+}$ complex at various times following the mixing of stock solutions. Emission features due to NQDs and the complex are observed as distinct maxima at 614 and 673 nm, respectively. Both features decrease in intensity with time upon mixing. The solid lines are the spectra of the NQD/$[Ru(bpy)(mcb)_2]^{2+}$ complex mixture at different times after mixing. The dashed line shows the emission spectrum of CdSe NQDs, and the dash-dotted line the spectrum of the $[Ru(bpy)(mcb)_2]^{2+}$ complex. The dotted line is a numerical sum of the two latter spectra. The inset shows the CdSe NQD relative PL quantum efficiency changes following mixing of NQDs with the complexes.

The emission from the NQDs is completely quenched within hours following the mixing, with less time required for higher molecular complex/NQD ratios. At low NQD and molecular complex concentrations, the quenching is likely not collisional in nature. Rather, it is attributed to gradual adsorption of the complexes onto the NQD surface. This is consistent with the observed increase in quenching over time. As shown in the inset of FIG. 4, the efficiency of NQD PL quenching in the NQD/molecular complex mixtures studied increases in the order $[Ru(bpy)_3]^{2+}$, $[Ru(bpy)_2(mcb)]^{2+}$, and $[Ru(bpy)(mcb)_2]^{2+}$. Because carboxylate-containing ligands can anchor to the surface of the CdSe NQDs, this trend most likely reflects an increased affinity of the complexes $Ru(bpy)_2(mcb)]^{2+}$, and $[Ru(bpy)(mcb)_2]^{2+}$ to the NQD surface, due to their ability to attach via the carboxylate functionalities.

One possible mechanism for NQD emission quenching is distorted surface passivation. However, the fact that emission intensities of both the NQDs and complexes are affected simultaneously suggests that quenching is caused by electronic interactions that occur upon attachment. We can exclude energy transfer as a possible mechanism for NQD PL quenching because of a very small spectral overlap between the absorption spectrum of the complexes and the NQD emission spectrum. This conclusion is also consistent with the fact that quenching of the NQD emission is not accompanied by a complementary growth of the complex PL intensity. Instead, the PL intensity is reduced for both the NQDs and the complexes. The latter observation is consistent with CT between the complexes and the NQDs While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A photocatalytic material, the photocatalytic material comprising:
   a) a plurality of nanocrystalline quantum dot absorbers, wherein each of the nanocrystalline quantum dot absorbers absorbs light emitted from a light source to generate at least one electron-hole pair and each nanocrystalline quantum dot absorbers comprises at least one semiconducting material selected from the group consisting of silicon, germanium, metal sulfides, metal selenides, metal tellurides, metal phosphides, and metal arsenides; and
   b) a molecular catalyst chemically coupled to each of the plurality of nanocrystalline quantum dot absorbers by a linking moiety, wherein each of the plurality of nanocrystalline quantum dot absorbers absorbs light emitted from a light source to generate at least one electron-hole pair, the at least one electron-hole pair having a sufficient potential to activate the molecular catalyst, and wherein the molecular catalyst oxidizes or reduces an electrolytic species.

2. The photocatalytic material according to claim 1, wherein each of the plurality of nanocrystalline quantum dots comprises at least one electron-hole pair having a potential that is sufficient to either reduce or oxidize the molecular catalyst.

3. The photocatalytic material according to claim 1, wherein the at least one semiconducting material is selected from the group consisting of cadmium sulfide, cadmium selenide, cadmium telluride, lead sulfide, lead selenide, silicon, indium phosphide, indium arsenide, and gallium arsenide.

4. The photocatalytic material according to claim 1, wherein the linking moiety is one of a carboxylic (—COOH) group, a phosphonate (—PO$_3$H$_2$) group, and a mercapto (—SH) group.

5. The photocatalytic material according to claim 1, wherein the molecular catalyst has an oxidation potential or reduction potential within a band gap of the nanocrystalline quantum dot.

6. The photocatalytic material according to claim 1, wherein the molecular catalyst is a ruthenium poly-pyridine complex.

7. The photocatalytic material according to claim 1, wherein the ruthenium poly-pyridine complex is one of cis, cis-[(bpy)$_2$(H$_2$O)Ru$^{III}$(μ-O)Ru$^{III}$(H$_2$O)(bpy)$_2$]$^{4+}$, cis-[Ru$^{IV}$(bpy)$_2$(py)(O)]$^{2+}$, [Ru$^{VI}$(bpy)$_2$(O)]$_2^{2+}$, and [Ru$^{IV}$(tpy)(bpy)(O)]$^{2+}$, where bpy=2,2' bipyridine and tpy=2,2':6',2"-terpyridine.

8. A photoelectrolytic device, the photoelectrolytic device comprising:
   a) an optically transparent electrode;
   b) an anode disposed on the optically transparent electrode, wherein the anode comprises:
      i. a wide band gap semiconductor disposed on the optically transparent electrode; and
      ii. a photocatalytic material chemically coupled to the wide band gap semiconductor, the photocatalytic material comprising:
      iii. a plurality of nanocrystalline quantum dot absorbers, wherein each of the nanocrystalline quantum dot absorbers absorbs light emitted from a light source to generate at least one electron-hole pair and each nanocrystalline quantum dot absorbers comprises at least one semiconducting material selected from the group consisting of silicon, germanium, metal sulfides, metal selenides, metal tellurides, metal phosphides, and metal arsenides; and
      iv. a molecular catalyst chemically coupled to each of the plurality of nanocrystalline quantum dot absorbers by a linking moiety, wherein the at least one electron-hole pair has a sufficient potential to activate the molecular catalyst, and wherein the molecular catalyst oxidizes an electrolytic species; and
   c) a cathode electrically connected to the anode.

9. The photoelectrolytic device according to claim 8, wherein the transparent electrode comprises at least one of tin oxide, indium oxide, zinc oxide, and combinations thereof.

10. The photoelectrolytic device according to claim 8, wherein the wide band gap semiconductor is a metal oxide.

11. The photoelectrolytic device according to claim 10, wherein the metal oxide is titanium oxide.

12. The photoelectrolytic device according to claim 8, wherein the wide band gap semiconductor is linked to each of the nanocrystalline quantum dot absorbers by a bifunctional linker.

13. The photoelectrolytic device according to claim 12, wherein the bifunctional linker comprises one of a carboxylic group, a phosphonate group, and a mercapto group.

14. The photoelectrolytic device according to claim 13, wherein the bifunctional linker comprises carboxy-thiol bifunctional ligands.

15. The photoelectrolytic device according to claim 8, wherein each of the plurality of nanocrystalline quantum dots comprises at least one electron-hole pair having a potential that is sufficient to either reduce or oxidize the molecular catalyst.

16. The photoelectrolytic device according to claim 8, wherein the at least one semiconducting material is selected from the group consisting of cadmium sulfide, cadmium selenide, cadmium telluride, lead sulfide, lead selenide, silicon, indium phosphide, indium arsenide, and gallium arsenide.

17. The photoelectrolytic device according to claim 8, wherein the linking moiety is one of a carboxylic group, a phosphonate group, and a mercapto group.

18. The photoelectrolytic device according to claim 8, wherein the molecular catalyst has an oxidation potential or reduction potential within a band gap of the nanocrystalline quantum dot.

19. The photoelectrolytic device according to claim 8, wherein the molecular catalyst is a ruthenium poly-pyridine complex.

20. The photoelectrolytic device according to claim 19, wherein the ruthenium poly-pyridine complex is one of cis, cis-[(bpy)$_2$(H$_2$O)Ru$^{III}$(μ-O)Ru$^{III}$(H$_2$O)(bpy)$_2$]$^{4+}$, cis-[Ru$^{IV}$(bpy)$_2$(py)(O)]$^{2+}$, [Ru$^{VI}$(bpy)$_2$(O)]$_2^{2+}$, and [Ru$^{IV}$(tpy)(bpy)(O)]$^{2+}$, where bpy =2,2' bipyridine and tpy =2,2':6',2"-terpyridine.

21. The photoelectrolytic device according to claim 8, wherein the cathode is platinum.

* * * * *